Patented Apr. 24, 1945

2,374,242

UNITED STATES PATENT OFFICE 2,374,242

POLYMERIZATION OF PIPERYLENE-OLEFIN MIXTURES AND PRODUCTS OBTAINED THEREFROM

Frank J. Soday, Swarthmore, Pa., assignor to The United Gas Improvement Company, a corporation of Pennsylvania No Drawing. Application February 19, 1941, Serial No. 379,707

18 Claims. (Cl. 260—93)

This invention relates to the preparation of synthetic hydrocarbon resins.

More particularly, this invention relates to the preparation of resinous piperylene polymers.

A principal object of the present invention is the preparation of hydrocarbon resins from cracked distillates of petroleum origin.

A further object of the present invention is the preparation of a hydrocarbon resin from cracked distillates in the piperylene boiling range, for example, in the boiling range of approximately 37 to 47° C.

Another object of this invention is the preparation of a hydrocarbon resin from a mixture of cracked distillates, in the piperylene boiling range, and aromatic hydrocarbons.

Other objects, including the provision of a simple and economical method of producing resins of this type, will be apparent from a consideration of the specification and claims.

The polymerization of piperylene has been investigated to only a very limited extent by other workers in this field due to the difficulty of preparing technically valuable products from this raw material, the chemical properties of which are virtually unknown. Substantially all of this work has been directed toward the production of synthetic rubber by the polymerization of piperylene, or of mixtures in which piperylene is a principal ingredient, with certain rubber-forming catalysts. It has been found that the use of metallic sodium for this purpose results in the production of a very good grade of synthetic rubber. In addition, the polymerization of aqueous emulsions or dispersions of piperylene, or of mixtures of piperylene with other rubber-forming hydrocarbons, by the application of heat, or by the use of certain oxygen-containing catalysts such as hydrogen peroxide, leads to the production of synthetic rubber.

I have found that the polymerization of piperylene under carefully controlled conditions results in the production of resinous polymers possessing a number of outstanding properties. Among these unique characteristics are the pronounced adhesive properties of the resins and their possession of certain elastic characteristics. This latter property is manifested by the unusual flexibility of the piperylene resins, as shown by their ability to resist severe distortion and mechanical abrasion and stresses when used as a coating material in certain applications.

Other desirable properties of these resins are their comparatively light colors, and the ease with which their softening points may be varied by suitable changes in the polymerizing process employed, as will be more fully explained hereinafter.

These resinous products differ from synthetic rubber in that they possess a definite and reproducible softening point, and are compatible with drying oils. In addition, they do not lend themselves to vulcanization by any of the methods usually employed for this purpose in the rubber industry.

An important commercial source of piperylene at the present time is the light oil obtained by the pyrolysis of petroleum, or of certain petroleum hydrocarbons. In particular, the light oil obtained as a by-product in the manufacture of oil gas or carburetted water gas is an especially desirable and abundant source of this material. I prefer to isolate the piperylene from such light oil by fractional distillation, the material having a boiling range of between approximately 37–47° C. being designated herein as my piperylene fraction. Exhaustive tests have shown that piperylene is the main unsaturated hydrocarbon present in this fraction, particularly when fairly high cracking temperatures have been employed in the preparation of the light oil from which such fractions have been isolated. Certain data indicate also that the piperylene exists in two or more isomeric forms in this fraction. If so, each form can be readily converted to the resinous products described herein as the polymerization of the overall fraction in the designated manner results in the practically quantitative conversion of the diolefins present to the desired type of resinous products.

The piperylene fractions obtained in this manner may contain quantities of other diolefins, such as butadiene, cyclopentadiene, and/or isoprene. However, the total quantity of such diolefins present in a given piperylene fraction is usually and preferably less than the quantity of piperylene present.

For example, a typical fraction may contain 45% piperylene, 21% olefins, 24% cyclopentadiene, 6% paraffines and 4% isoprene.

The cyclopentadiene is preferably removed prior to polymerization such as by the method described and claimed in Patent 2,211,038, dated August 13, 1940, to Alger L. Ward.

This typical fraction then would contain 59% piperylene, 28% olefins, 8% paraffines and 5% isoprene.

As a result of extensive experimentation I have discovered that highly satisfactory solid resinous polymers may be produced upon polymerization of such fractions using boron trifluoride as catalyst as distinguished from all other catalysts of this type and complexes thereof and including complexes of boron trifluoride itself, provided the polymerizing temperature throughout the reaction is held below 10° C. and preferably below −10° C., and particularly below −20° C.

The resins obtained by my process are light in color, solid at room temperature, possess definite and reproducible softening points, and are compatible with drying oils. In addition, they are inert in character, are extremely resistant to attack by moisture, and possess excellent dielectric properties.

By the use of my process, the formation of liquid polymer and insoluble polymer, which are usually obtained in considerable quantities upon the polymerization of diolefins in general, may be completely eliminated, or at least very substantially reduced, my experiments showing that when the temperature is as low as at least 0° C. substantially all soluble polymer is produced.

The piperylene resins obtained by this process are completely compatible with the usual drying oils, such as tung oil and linseed oil, and can be used for the preparation of varnishes, paints, lacquers, and other coating compositions. The coating films obtained by the application of the foregoing coating compositions to surfaces, such as wood, metal, fiber, or fabric surfaces, or others, are unusually resistant to attack by moisture and by a wide variety of corrosive liquids, such as dilute alkaline or acid solutions. Reference is made to my copending application Serial No. 379,709, filed Feb. 19, 1941.

These resins also are ideally suited for the preparation of piperylene resin emulsions, as more fully described in my copending application Serial No. 379,708, filed February 19, 1941.

The light oil obtained in the manufacture of oil gas or of carburetted water gas is a very desirable source of the piperylene fractions used in my invention, and the products obtained are of unusually high quality.

Light oil piperylene fractions invariably contain olefins, such as the isomeric amylenes, which also enter into the reaction to a degree dependent upon the drasticity of the polymerizing conditions employed. Under the usual operating conditions, a considerable portion of the olefins present are incorporated in the resinous polymers obtained. As the ratio of piperylene to the other unsaturated or reactive hydrocarbons present in the reaction mixture has a considerable influence upon the quality and yield of the resulting polymer, as will be more fully explained hereinafter, it is preferred that the composition of the piperylene fraction employed be controlled within limits to be hereinafter set forth.

Fractions containing almost any desired proportion and concentration of piperylene and other unsaturated hydrocarbons may be obtained by fractionation of the light oil. In addition, various other methods may be used for obtaining the selected ratio and/or concentration of piperylene and olefins in such fractions. For example, if the proportion of piperylene in any given fraction is too high to permit the production of a resin having the desired characteristics, a portion of the piperylene may be removed prior to polymerization, such as by treating the solution with a suitable quantity of cuprous chloride, followed by filtration to remove the piperylene-cuprous chloride complex formed. An alternative method of increasing or decreasing the relative proportions of any of the components at will comprises blending a given fraction with a fraction rich in the desired component or components, or with the desired component in a pure or relatively pure form. For example, the substantially pure piperylene obtained by decomposing the piperylene-cuprous chloride complex previously referred to, such as by the application of heat, may be added to a second fraction deficient in piperylene.

The piperylene preferably comprises 90% or more of the total diolefins present, although highly satisfactory resins have been obtained when using a mixture of diolefins in which the piperylene content was 75%, or less, based on the total diolefin content, said mixture also containing olefins.

Although light oil fractions containing any desired concentration of piperylene may be used, I have found that fractions containing from 40% to 98% piperylene give especially good results. The exact concentration and ratio of the piperylene and olefins present in any particular fraction depends, among other things, upon the cracking conditions under which the light oil was produced, as well as upon the extent to which the light oil has been fractionated. In the same way, fractions possessing a higher piperylene concentration and a higher ratio of piperylene to olefins may be obtained by efficiently fractionating a given sample of light oil, such as by the use of a fractionating column possessing a large number of theoretical plates in conjunction with the use of a relatively large reflux ratio, than can be obtained by the use of less drastic refining methods.

It is apparent that light oil fractions containing the desired concentrations of unsaturated hydrocarbons, as well as any desired ratio of diolefins to olefins, can be obtained by the use of the foregoing methods, either alone or in combination.

The most important variables in the conversion of light oil piperylene fractions to soluble solid resinous polymers by my invention are (1) concentration of unsaturated hydrocarbons, (2) proportion of catalyst used, (3) temperature, (4) ratio of piperylene to olefins or other reactive compounds, (5) time of contact, and (6) the specific procedure employed in contacting the reactants.

With respect to the concentration of unsaturated hydrocarbons present in the reaction mixture, it has been found that the addition of limited quantities of an aliphatic or aromatic solvent to the piperylene fraction is desirable, particularly when the original piperylene fraction contained an unusually high proportion of unsaturated hydrocarbons (olefins and diolefins). This provides a dispersion medium for the catalyst during the polymerizing reaction, and prevents the reaction mixture from solidifying during the later stages of the reaction. In addition, the diluted resin solutions so obtained can be more readily hydrolyzed during the subsequent treatment to remove the catalyst.

In this connection, it is well to point out that the use of certain solvents to reduce the concentration of unsaturated hydrocarbons present in the reaction mixture may affect the nature or yield of the resinous polymers subsequently obtained. For example, the use of toluene or higher boiling aromatic hydrocarbons for this purpose may result in the production of resinous polymers having chemically combined a substantial quantity of toluene or other aromatic hydrocarbon residues. In general, the resins obtained in this manner possess very desirable characteristics.

The quantity of catalyst used and the manner in which it is added to the reaction mixture has a considerable influence upon the nature and yield of the polymer obtained. There appears to be a certain minimum concentration of catalyst below which polymerization does not take place. While this quantity varies somewhat with the specific light oil fraction used, it may be stated that very little, if any, polymerization occurs when less than 0.1% of boron trifluoride, based on the total unsaturated hydrocarbons present, is used.

The catalyst is preferably added in small increments in order to maintain the temperature of the reaction mixture at a reasonably constant level. The addition of large quantities of catalyst during very short periods of time usually results in sudden temperature surges which may raise the temperature of the reaction mixture to undesirable levels.

The catalyst may be added to the reaction mixture in any desired manner. A suitable procedure is to slowly bubble the gaseous boron trifluoride, or a mixture of gaseous boron trifluoride with an inert or other gas, through the reaction mixture at the desired temperature, care being exercised to avoid feeding the catalyst at too high a rate.

My process may be carried out at any desired pressure above, below, or at, atmospheric pressure. However, atmospheric or slightly above atmospheric pressure is usually preferred in order to retard or prevent loss of catalyst.

The reaction is conveniently carried out in a vessel equipped with an agitator in order to insure a uniform distribution of reactants during the polymerizing process, as well as to enable the temperature of the reaction mixture to be controlled within the desired limits. In this event, the catalyst may be introduced below, or immediately underneath, the agitator blade if desired, in order to permit a rapid and uniform distribution of the catalyst.

An alternative procedure comprises the addition of the gaseous boron trifluoride, either as such or in admixture with an inert or other gas such as nitrogen, into the free space above the liquid in the reaction vessel. The catalyst then is absorbed into the body of the reaction mixture. This procedure also may be carried out under increased pressure, if desired, in order to prevent any undue loss of catalyst.

Another procedure for introducing the catalyst comprises dissolving the catalyst in a liquid, which may then be added to the reaction mixture at any desired rate.

The molecular weight, and hence the softening point, of the resinous material may be varied over a considerable range by controlling the polymerizing temperature. Generally speaking, the use of temperatures considerably below 10° C. results in the production of resinous polymers having relatively high softening points and, conversely, the use of polymerizing temperatures approaching 10° C. results in resinous polymers having relatively low softening point. Excellent results are obtained by the use of polymerizing temperatures in the range of −10 to −70° C., and particularly in the range of −20° C. to −70° C.

The ratio of piperylene to olefins and/or other reactive compounds present in the starting material has a considerable influence upon the physical properties of the product obtained. Thus, in general, an increase in the ratio of the olefins and/or the other reactive materials to piperylene results in a corresponding reduction in the softening point of the resinous polymers subsequently obtained. Conversely, an increase in the ratio of piperylene to other unsaturated hydrocarbons results in the production of resinous polymers having relatively higher softening points.

The molecular weight, and hence the softening point, of the resin can be varied within fairly wide limits by suitable variations in the polymerizing time employed. In general, and with all other conditions unchanged, an increases in the polymerizing time results in an increase in the softening point of the piperylene resin. This is an important consideration, as it permits resins having different softening points to be prepared from the same piperylene fraction.

A convenient method of preparing a series of piperylene resins having different softening points consists of polymerizing the desired piperylene fraction and removing suitable portions of the polymerized material from the reaction vessel at definite intervals of time, followed by the neutralization and hydrolysis of the respective samples after removal from the reaction vessel. In this way, a series of resins having increasing melting points will be obtained.

The specific procedure employed in contacting the reactants also exerts a considerable influence upon the properties of the resin subsequently obtained. For example, the use of the batch process for the polymerization of piperylene, particularly when the catalyst is added in several small portions to the reaction mixture during the course of the reaction, results in the production of polymers having relatively high melting points. On the other hand, the polymerization of piperlylene in a continuous system, either concurrent or countercurrent in nature, results in the production of resins having somewhat lower melting points.

In general, the following may be said to be reasonably preferred limits for the reaction variables previously discussed: (1) total concentration of unsaturated hydrocarbons: 10% to 80% by weight, (2) quantity of boron trifluoride catalyst: 0.1% to 5.0% by weight of the total unsaturated and reactive compounds present, (3) temperature: −70° C. to −10° C., (4) proportion of piperylene present in terms of the total unsaturated aliphatic compounds (olefins and diolefins): from 40% to 98% by weight, and (5) reaction time, up to 48 hours.

As piperyline fractions may spontaneously polymerize to form oily polymers when permitted to stand at room temperature for prolonged periods of time, inhibitors such as hydroquinone may be added to such fractions to prevent the formation of such undesirable polymers. It has been found that such inhibited fractions may be polymerized with gaseous boron trifluoride without removing the inhibitor prior to polymerization.

After polymerization of the piperyline fraction or mixture, either in the presence or absence of an inhibitor, the reaction mixture preferably is treated in some manner to remove the unchanged catalyst present. This can be accomplished by a number of different procedures. For example, the reaction mixture may be heated to an elevated temperature, either with or without the application of vacuum, until substantially all of the gaseous boron trifluoride has been removed. During this procedure steam or an inert gas, such as carbon dioxide, may be passed through the reaction mixture to assist in the removal of the catalyst if desired. In case steam is used for this purpose, residual catalyst is hydrolyzed and the resulting mass may be filtered subsequently in order to remove all solid extraneous material.

A preferred procedure for neutralizing the reaction mixture comprises the addition of a neutralizing agent, such as a basic inorganic or organic material, either alone or in the form of a solution or suspension in a suitable liquid, such as water or aqueous alcohol. Examples of suitable basic neutralizing agents are sodium hydroxide, calcium hydroxide, ammonia, organic amines, and alcoholamines. After the neutralizing reaction has been completed, the solution then may be filtered to remove all solid extraneous material.

These two procedures may be combined, if desired, in order to reduce the quantity of neutralizing agent required. For example, this may comprise heating the reaction mixture to room temperature, or above, in order to remove the major portion of the gaseous boron trifluoride present, followed by the addition of the desired neutralizing agent, such as an aqueous or an aqueous-alcoholic solution or suspension of an alkali, to hydrolyze the remainder of the catalyst. This usually is followed by filtration to remove solid products.

The filtration step may be carried out in several ways, such as by filtration through cloth or paper in a conventional type filter press. Various filter aids, such as clay or diatomaceous earth, may be added to the neutralized solution prior to filtration in order to assist in the removal of finely divided impurities. A basket type centrifuge, or a supercentrifuge of any convenient type, also may be used in place of a filter press, if desired.

After neutralization and, if necessary, filtration, and/or other purifying steps the resinous solution is ready for use for many purposes, such as the preparation of spirit varnishes or enamels or the impregnation or coating of paper, fiber, or fabric articles. Alternatively, the solvent present may be removed in any suitable manner, which results in the isolation of a solid resin.

A desirable procedure for removing the unpolymerized material from the final resinous solution comprises distillation, such as at atmospheric or reduced pressures. Passing a stream of steam or an inert gas through the resinous solution during this procedure, particularly in its later stages, will materially assist in the removal of the last traces of any unpolymerized material present. Further treatment, particularly with superheated steam at reduced pressures, will assist in the removal of any low-molecular weight polymers present, thus increasing the melting point of the resin subsequently obtained.

Another procedure for isolating the resinous polymer comprises the addition to the resinous solution of a liquid in which the resin is substantially insoluble, but in which the unpolymerized material is soluble. Suitable liquids for this purpose include the low-molecular weight aliphatic alcohols, such as methyl alcohol or ethyl alcohol. The precipitated resinous material may be further treated to remove traces of residual solvent, if desired by working on hot rolls, or by other suitable means.

Still another procedure for isolating the piperylene resin comprises dispersing the reaction mixture in the form of a very fine spray under conditions in which the unpolymerized material present is volatilized. In this procedure, the resin solution which has been preferably suitably pre-heated such as by heating under pressure, is sprayed into a tower or other vessel, where it is subjected to elevated temperature and/or passed countercurrent to a stream of hot air, gas, or steam. The tower or vessel may be operated under reduced pressure, if desired, and the drying process may be further facilitated by the introduction into the tower, or vessel either as such or in admixture with the resin solution, steam, heated gases, or suitable low boiling liquids. The function of these added materials is to impart sensible heat to the system in order to assist in removing the last traces of unpolymerized material from the resinous product during the drying process.

An alternative procedure comprises the addition to the reaction mixture prior to its introduction into the spray drying system of controlled quantities of a liquid in which the resin is insoluble, but in which the unpolymerized material present in the resinous solution is soluble. This is preferably accompanied by fairly rapid agitation in order to form a colloidal, or semi-colloidal, suspension of the resinous material prior to introduction into the spray drying system. By a suitable control of the several variables involved, the piperylene resin may be isolated in the form of particles of almost any desired size.

Other methods of isolating the resin will suggest themselves to those familiar with the art, such as passing the resinous solution over suitable hot rolls, and the like.

Any or all of the foregoing procedures may be carried out in continuous, semi-continuous, batch, countercurrent, batch countercurrent or other manner, as desired. For example, countercurrent streams of a mixture of piperylene fraction and solvent, and catalyst may be continuously charged to a suitable unit, such as a pipe coil, a combined pipe coil and reaction vessel, or a reaction vessel of suitable design, from which the polymerized fraction may be withdrawn continuously, semi-continuously, or batchwise as desired. This unit, of course, must be maintained at the desired polymerizing temperature, that is, at a temperature below 10° C. It is apparent that the reactants may be kept in contact with each other for any desired period of time.

An alternative procedure comprises dissolving the gaseous boron trifluoride in some inert liquid, such as an inert solvent employed in the polymerizing process, and adding it to the piperylene fraction in this manner.

Likewise neutralization of the reaction mass may be carried out in a batchwise manner or it can be accomplished in a continuous or semi-continuous manner or otherwise. A suitable procedure comprises the continuous or semi-continuous addition of gaseous ammonia, or a mixture or solution of ammonia in alcohol or other suitable solvent, followed by raising the temperature of the reaction mixture to room temperature. In place of ammonia, an organic amine may be used, if desired.

Another procedure comprises the continuous or semi-continuous or other addition of alcohol, or a mixture or solution of other basic material, such as inorganic alkalies, followed by heating the mixture to room temperature.

Alternative procedures comprise heating the reaction mass to room temperature, or above, with or without the application of vacuum, followed by the continuous or semi-continuous or other addition of any of the foregoing neutralizing agents, mixtures, or solutions.

The neutralized reaction mass may be filtered in a continuous or semi-continuous or other manner, as desired. For example this may be accomplished by the use of one of a battery of two filter presses, the second filter press being used whenever the operation of the first press is temporarily discontinued in order to permit the accumulated solid material to be removed.

Another procedure comprises the use of a continuous or semi-continuous or batch centrifuge, or series of centrifuges.

The clarified resinous solution may be distilled, or otherwise treated, in order to remove volatile unpolymerized material, if desired. This may be done for example in a continuous still, preferably operating under vacuum. Steam or an inert gas may be used during distillation to assist in the removal of the volatile material, if desired.

An alternative procedure comprises the continuous or semi-continuous or other addition of a coagulating agent, such as alcohol, to the clarified resinous solution, followed by separating the precipitated resin from the supernatant liquid, suitably by filtration or decantation. The precipitated resin may be treated subsequently to remove traces of residual solvent, such as by working on hot rolls or other means, as desired.

Another procedure comprises continuously or semi-continuously or otherwise processing the clarified resin solution in the spray drying system previously described.

The solid resin prepared by any of the foregoing procedures may be further processed or treated to improve its properties, if desired. For example, it may be treated with various decolorizing agents, such as clay, activated clay, carbon, activated carbon, bone char, graphite, fuller's earth, diatomaceous earth, and the like, at normal or elevated temperatures. The resin is preferably dissolved in a suitable solvent prior to any such treatment.

After treatment, the resin or resin solution is separated from any such treating agent, suitably by filtration. In case the resin has been dissolved in a solvent prior to treatment, the resinous solution may be treated to separate the resin from the solvent, if desired, by any of the procedures previously described for this purpose.

On the other hand, the clarified resin solution may be used as such for many purposes, such as the preparation of spirit varnishes or for impregnating or coating various materials, such as paper or textiles.

In place of the foregoing decolorizing procedures, other decolorizing methods may be used, if desired. A satisfactory method for this purpose comprises treating the resin, or preferably a solution of the resin in an inert solvent, with a strong mineral acid, followed by neutralizing and/or contacting the mixture with an adsorbent such as clay or fuller's earth. The clarified solution then may be treated to remove the solvent present by any of the methods previously discussed, if desired.

As these treating procedures are preferably applied to a solution of the resin, the process can be simplified by treating the original resin solution, suitably after it has been neutralized and clarified in the desired manner, prior to the hardening operation.

My new method for the preparation of solid resinous polymers from piperylene fractions may be further illustrated by means of the following examples.

Example 1

A 48.4 gram portion of a light oil piperylene fraction containing 81.0% by weight of piperylene, 10.2% by weight of amylenes, and 8.8% by weight of pentanes was placed in a one liter flask and immersed in a cooling bath. Approximately 175 cc. of toluene was added to the same flask, after which the temperature of the mixture was reduced to $-65°$ C. Small portions of gaseous boron trifluoride were passed into the reaction flask at five minute intervals until no further rise in temperature was noted after the addition of another portion of gaseous boron trifluoride. As the reaction is exceedingly exothermic in nature, the temperature of the reaction mixture was raised above $-65°$ C. during the early stages of the process upon the addition of the gaseous boron trifluoride. In each case, the addition of gaseous boron trifluoride was discontinued until the temperature of the reaction mixture was reduced to $-65°$.

The mixture was maintained at this temperature for an additional period of 45 minutes, after which the temperature was permitted to rise to $+10°$ C. in order to remove the major portion of the boron trifluoride present. The remainder of the catalyst was hydrolyzed by the addition of 20 cc. of water, after which the reaction mixture was agitated for a period of one half hour. At this point, 100 grams of calcium oxide were added to the mixture, with agitation, after which the mixture was filtered. The unpolymerized material then was removed by steam distillation under reduced pressure.

Appoximately 42.6 grams of a hard, light yellow colored resin were obtained. The resinous product was completely soluble in the usual hydrocarbon solvents and had a melting point of 74.5° C. as determined by the standard A. S. T. M. ball and ring melting point method. It was completely compatible with the usual drying oils.

Example 2

A 74 gram portion of a piperylene fraction obtained by the fractionation of light oil from oil gas and containing 74% by weight of piperylene, 16% by weight of amylenes, and 10% by weight of pentanes (as well as 0.05% by weight of hydroquinone) was added to 75 grams of toluene, after which the mixture was cooled to $-20°$ C. and polymerized in a manner similar to that described in Example 1.

Approximately 22.9 grams of a light colored, solid resin was obtained.

Example 3

A 34 gram portion of a piperylene fraction, obtained by the fractionation of light oil from oil gas and containing 74% by weight of piperylene, 16% by weight of amylenes, and 10% by weight of pentanes (as well as 0.05% by weight of hydroquinone) was added to 75 grams of toluene and the mixture polymerized at a temperature of $-60°$ C. in a manner similar to that outlined in Example 1.

Approximately 30.1 grams of a light colored resin was obtained. The resinous product had a melting point of 63.5° C. as measured by the A. S. T. M. ball and ring method.

Example 4

A mixture of 676 grams of a light oil piperylene fraction, containing 74% piperylene, 16% amylenes, and 10% pentanes, and 1324 grams of toluene was placed in a 5 liter flask and cooled to −65° C. Gaseous boron trifluoride was introduced into the upper portion of the reaction vessel at suitable intervals during a period of 78 minutes, the total quantity added amounting to 7.3 grams.

The reaction mixture was permitted to stand for a period of one hour at a temperature of −60° C. after which it was brought to room temperature and agitated for a period of one hour with 100 cc. of water. After drying with 500 grams of calcium oxide, the mixture was filtered and the unpolymerized material removed by steam distillation.

A total of 430 grams of a light colored resin having a melting point of 51° C. as determined by the standard A. S. T. M. ball and ring softening point method was obtained.

Example 5

A 34 gram portion of a piperylene fraction obtained by the fractionation of light oil from oil gas, and containing 74% piperylene, 16% amylenes, and 10% pentanes (as well as 0.05% hydroquinone) was added to 75 grams of toluene and the mixture polymerized at a temperature of 0° C. according to the method outlined in Example 1. The reaction mixture was permitted to stand for a period of 12 hours prior to the hydrolysis of the catalyst.

Approximately 21.2 grams of a light colored resin having an A. S. T. M. softening point of 57° C. was obtained.

Example 6

A mixture of 34 grams of the piperylene fraction used in Example 5 and 75 grams of toluene was polymerized according to the method outlined in Example 5, with the exception that the catalyst was neutralized immediately after the polymerizing reaction had been completed.

Approximately 24.2 grams of a fairly soft, light colored resin was obtained.

The term "piperylene fraction", as used herein, refers to a hydrocarbon fraction in which piperylene does not exceed 98% of the unsaturated hydrocarbons present and substantially all of which has a boiling range between approximately 37–47° C. It is understood that the presence of small quantities of very low boiling material and/or very high boiling material may carry the initial and/or end points beyond this range.

The term "light oil piperylene fraction", as used herein, refers to a hydrocarbon fraction of the foregoing characteristics obtained by the fractionation of the pyrolysis products of petroleum, or of a petroleum hydrocarbon or mixture of petroleum hydrocarbons or of coal. The petroleum hydrocarbon pyrolysis products are preferred.

While the features herein described comprise preferred embodiments of my invention, it is to be understood that the invention is not to be limited to these precise features, and that changes may be made therein without departing from the scope of the invention, which is defined in the appended claims.

I claim:

1. A process for the polymerization of an olefin containing light oil piperylene fraction boiling between approximately 37° C. and 47° C. and containing from 10 to 80% by weight of unsaturated hydrocarbons, the proportion of piperylene present in the said fraction ranging from 40% to 98% by weight of the total unsaturated aliphatic hydrocarbons present with said piperylene forming the preponderant portion of the diolefin content thereof, comprising adding from 0.1% to 5.0% by weight of boron trifluoride based on the unsaturated hydrocarbons present to the said fraction at a temperature below −10° C.

2. A process for the polymerization of a mixture of an olefin containing light oil piperylene fraction and aromatic hydrocarbon material, said fraction boiling between approximately 37° C. and 47° C. and containing from 10% to 80% of unsaturated aliphatic hydrocarbons, the proportion of piperylene present in the said mixture ranging from 40% to 98% by weight of the total unsaturated aliphatic hydrocarbons present with said piperylene forming the preponderant portion of the diolefin content thereof, comprising adding from 0.1% to 5.0% by weight of boron trifluoride based on the unsaturated aliphatic hydrocarbons present to the said mixture at a temperature below −10° C.

3. A process for the polymerization of an olefin containing light oil piperylene fraction boiling between approximately 37° C. and 47° C. and containing from 10% to 80% by weight of unsaturated hydrocarbons, the proportion of piperylene present in the said fraction ranging from 40% to 98% by weight of the total unsaturated hydrocarbons present with said piperylene forming the preponderant portion of the diolefin content thereof, comprising adding from 0.1% to 5.0% by weight of boron trifluoride based on the unsaturated hydrocarbons present to the said fraction at a temperature in the range of from −20° C. to −70° C.

4. A process for the polymerization of a mixture of an olefin containing light oil piperylene fraction and aromatic hydrocarbon material, said fraction boiling between approximately 37° C. and 47° C. and containing from 10% to 80% by weight of unsaturated aliphatic hydrocarbons, the proportion of piperylene present in the said mixture ranging from 40% to 98% by weight of the total unsaturated aliphatic hydrocarbons present with said piperylene forming the preponderant portion of the diolefin content thereof, comprising adding from 0.1% to 5.0% by weight of boron trifluoride based on the unsaturated aliphatic hydrocarbons present to the said mixture at a temperature in the range of from −20° C. to −70° C.

5. The product of the process of claim 3.

6. A process for the production of resin solid at room temperature by the polymerization of a piperylene-olefin mixture boiling between approximately 37° C. and 47° C. in which the preponderant proportion of the diolefin material present is piperylene and which contains a concentration of piperylene between 40 and 98% by weight of the total unsaturated aliphatic hydrocarbons present which comprises adding boron trifluoride to said mixture at a temperature below 10° C.

7. A process for the production of resin having a softening point above room temperature by the polymerization of a light oil piperylene fraction containing olefin material and boiling between approximately 37° C. and 47° C. and containing piperylene as the preponderant diolefin unsaturation thereof, the concentration of piperylene being equal to between 40 and 98% by weight of the total unsaturated aliphatic hydrocarbons present, which comprises adding boron trifluoride to said fraction at a temperature below 10° C.

8. A process for the production of a resin solid at room temperature by the polymerization of an olefin containing light oil piperylene fraction boiling between approximately 37° C. and 47° C., said fraction having been obtained from products of petroleum oil pyrolysis, the piperylene content of said fraction being in substantial excess by weight of the content of said olefin material and in excess of the total of any other diolefin material contained therein, which comprises adding boron trifluoride to said fraction at a temperature below —20° C.

9. A process for the production of resin solid at room temperature by the polymerization of a piperylene-olefin mixture boiling between approximately 37° C. and 47° C. and in which the concentration of piperylene is between 40% and 98% by weight of the total unsaturated aliphatic hydrocarbons present and in which the preponderant portion of the diolefin material present is in the form of piperylene, comprising adding to said mixture aromatic hydrocarbon material, and thereafter subjecting said mixture to polymerization in the presence of boron trifluoride at a temperature below 10° C.

10. A process for the production of resin solid at room temperature by the polymerization of a piperylene-olefin mixture boiling between approximately 37° C. and 47° C. and in which the concentration of piperylene is between 40% and 98% by weight of the total unsaturated aliphatic hydrocarbons present and in which the preponderant portion of the diolefin material present is in the form of piperylene, comprising adding toluene to said mixture, and thereafter subjecting said mixture to polymerization in the presence of boron trifluoride and at a temperature below 10° C.

11. A process for the production of resin solid at room temperature from a light oil fraction obtained from products of petroleum oil pyrolysis produced in the manufacture of combustible gas and containing piperylene, cyclopentadiene and olefinic material, comprising concentrating the piperylene in said fraction with the removal of the preponderant part of said cyclopentadiene therefrom so that piperylene forms the preponderant portion of the diolefin content of said fraction and so that the concentration of piperylene in said fraction is between 40% and 98% by weight of the total unsaturated aliphatic hydrocarbons present and so that said fraction boils between approximately 37° C. and 47° C., and thereafter subjecting said fraction to polymerization by the addition of boron trifluoride thereto at a temperature below 10° C.

12. A process for the production of resin solid at room temperature from a light oil fraction obtained from products of petroleum oil pyrolysis produced in the manufacture of combustible gas and containing piperylene, cyclopentadiene and olefinic material, comprising concentrating the piperylene in said fraction with the removal of the preponderant part of said cyclopentadiene therefrom so that piperylene forms the preponderant portion of the diolefin content of said fraction and so that the concentration of piperylene in said fraction is between 40% and 98% by weight of the total unsaturated aliphatic hydrocarbons present and so that said fraction boils between approximately 37° C. and 47° C., and thereafter subjecting said fraction to polymerization in the presence of an aromatic hydrocarbon material by the addition of boron trifluoride thereto at a temperature below 10° C.

13. The product of the process of claim 6.
14. The product of the process of claim 8.
15. The product of the process of claim 9.
16. The product of the process of claim 10.
17. The product of the process of claim 11.
18. The product of the process of claim 12.

FRANK J. SODAY.